(12) United States Patent
Guillanton et al.

(10) Patent No.: US 9,085,242 B2
(45) Date of Patent: Jul. 21, 2015

(54) POWER PLUG

(71) Applicant: DELPHI INTERNATIONAL OPERATIONS LUXEMBOURG S.a.r.l., Bascharage (LU)

(72) Inventors: Erwan Guillanton, Maintenon (FR); Abdelaaziz Elmanfalouti, Elancourt (FR); Aymeric Perot, Epernon (FR); Gilles Schmitt, Senantes (FR)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 0 days.

(21) Appl. No.: 14/225,547

(22) Filed: Mar. 26, 2014

(65) Prior Publication Data

US 2014/0295714 A1    Oct. 2, 2014

(30) Foreign Application Priority Data

Apr. 2, 2013  (EP) .................................. 13162036

(51) Int. Cl.
*B60L 11/18* (2006.01)
*H01R 13/11* (2006.01)
*H01R 13/42* (2006.01)

(52) U.S. Cl.
CPC .......... *B60L 11/1838* (2013.01); *H01R 13/111* (2013.01); *H01R 13/42* (2013.01); *H01R 2201/26* (2013.01)

(58) Field of Classification Search
CPC ............. H01R 13/426; H01R 13/4367; H01R 13/516; H01R 13/629; H01R 13/642; H01R 13/6582
See application file for complete search history.

(56) References Cited

U.S. PATENT DOCUMENTS

| | | | |
|---|---|---|---|
| 4,013,331 A | | 3/1977 | Kobler |
| 4,255,007 A | * | 3/1981 | Michaels et al. .............. 439/332 |
| 5,350,292 A | | 9/1994 | Sanders et al. |
| 5,921,803 A | | 7/1999 | Mori |

(Continued)

FOREIGN PATENT DOCUMENTS

| | | |
|---|---|---|
| EP | 605083 A1 | 10/1997 |
| EP | 1271703 A1 | 1/2003 |

(Continued)

OTHER PUBLICATIONS

European Search Report for EP Appl. No. 13 16 2036 Published Aug. 30, 2013.

*Primary Examiner* — Truc Nguyen
(74) *Attorney, Agent, or Firm* — Robert J. Myers

(57) ABSTRACT

A power plug comprising a housing with a plurality of receptacles and extending along a receptacle axis parallel to the mating direction. Each receptacle has a central part and a front part with an opening to receive a male terminal of the complementary electrical socket. The power plug comprises a plurality of female terminals passing through the housing in parallel to the mating direction. Each female terminal includes a central part located in the central part of the receptacle, and a front part projecting from the central part in the mating direction and receiving a male terminal. The receptacle includes a plurality of ribs arranged radially on an inner side of the receptacle and protruding transversely inward. The ribs of the receptacle cooperate with the front part of the corresponding female terminal to center the front part of the corresponding female terminal with respect to the receptacle axis.

12 Claims, 4 Drawing Sheets

(56) References Cited

U.S. PATENT DOCUMENTS

| | | |
|---|---|---|
| 2008/0287000 A1 | 11/2008 | Yavari et al. |
| 2012/0003868 A1* | 1/2012 | Daugherty et al. ........ 439/540.1 |
| 2012/0231644 A1* | 9/2012 | Kinoshita .................... 439/205 |
| 2012/0258635 A1* | 10/2012 | Osawa .......................... 439/660 |
| 2013/0196522 A1* | 8/2013 | Hara ............................. 439/136 |

FOREIGN PATENT DOCUMENTS

| | | |
|---|---|---|
| GB | 1463528 A | 2/1977 |
| WO | 2012169144 A1 | 12/2012 |

* cited by examiner

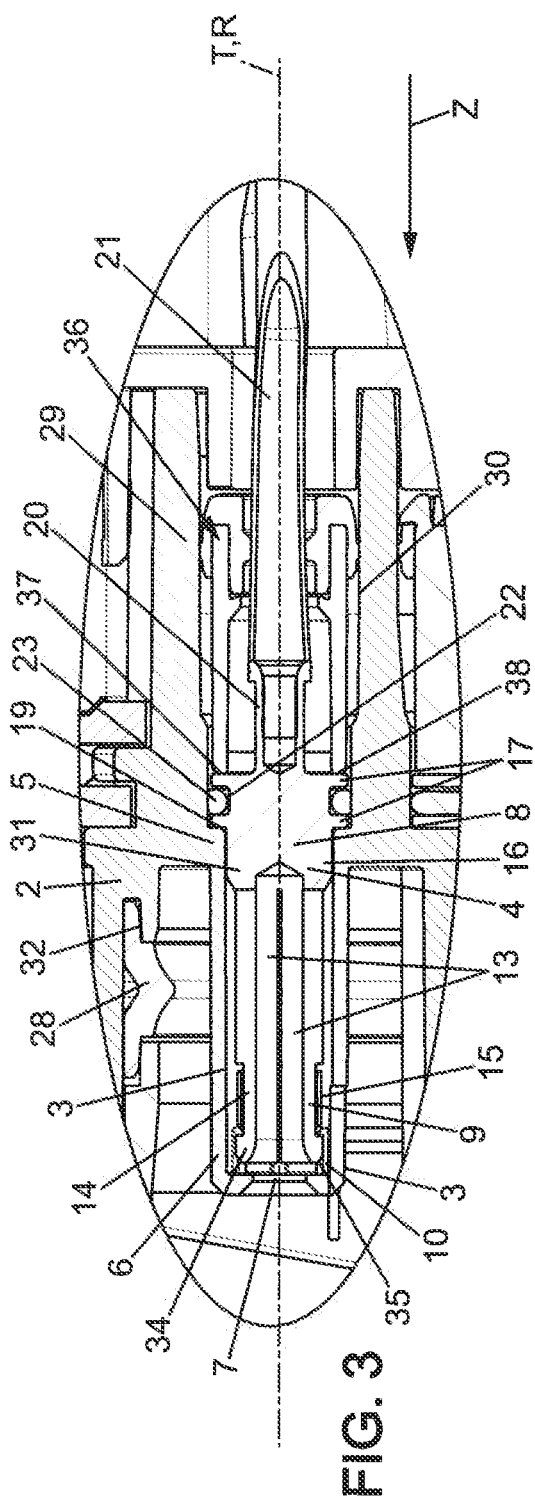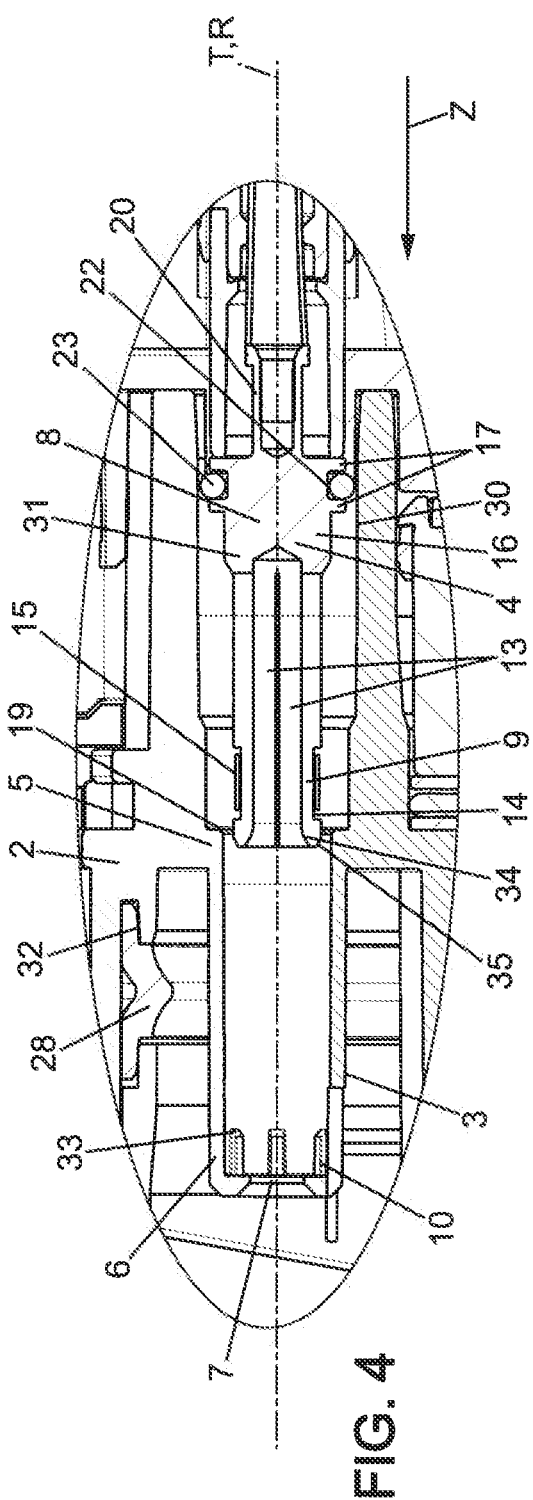

POWER PLUG

CROSS-REFERENCE TO RELATED APPLICATION

This application claims the benefit under 35 U.S.C. §119(a) of European Patent Application EP 13162036.1, filed on 2 Apr. 2013, the entire disclosure of which is hereby incorporated by reference.

TECHNICAL FIELD OF THE INVENTION

The invention generally relates to electrical connectors and electrical connection assemblies comprising such connectors.

BACKGROUND OF THE INVENTION

In particular, the instant invention is related to a power plug intended to be coupled with a complementary electrical socket (not shown), as those used in today hybrid or electric vehicles. The batteries of such electric vehicles need to be repeatedly charged by plugging them into charging stations. To this purpose, an electrical connection having appropriate cables, connectors and sockets connecting the electrical car and the charging station is required. The electrical connectors of such electrical connections usually have electrical plugs with a plurality of contact pins as cable ends to be inserted into a socket in order to provide the required electrical connection. If the power plug is not inserted correctly into the socket of an electrical vehicle, it may happen that the contact pins of the plug inhibit the current flow and/or cause short-circuit while charging the battery, and also it can lead to serious injuries to the user.

Whereas, classically, in the automotive industry, electrical connectors are usually mated only once, or occasionally for maintenance, vehicle charging occurs repeatedly and might also occur with varying mating connectors (mounted in various cars in case of public charging). It means up-to-now unknown cycling issues occur for such connectors.

The instant invention has notably for object to mitigate the above mentioned drawbacks.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

To this aim, according to the invention, such an electrical power plug intended to be coupled with a complementary electrical socket (not shown) in a mating direction includes a housing including a plurality of receptacles extending along a receptacle axis parallel to the mating direction, wherein each receptacle is designed to receive a female terminal (not shown), and wherein the receptacle has a central part and a front part provided with an opening intended to receive a male terminal of the complementary electrical socket. The power plug further includes a plurality of generally cylindrical female terminals located through the housing in parallel to the mating direction, wherein the female terminal includes a central part located in the central part of the receptacle, a front part projecting from the central part in the mating direction and intended to receive a male terminal of the complementary electrical socket.

The receptacle includes a plurality of ribs arranged radially on an inner side of the receptacle, and protruding transversely inward, wherein the ribs of the receptacle cooperate with the front part of the corresponding female terminal to center the front part of corresponding female terminal with respect to the receptacle axis.

In some embodiments, one might also use one or more of the following features taken alone or in combination:

- each of the receptacles, intended to receive corresponding female terminal, has generally a cylindrical shape;
- the central part of each receptacle includes a shoulder forming a front stop for the female terminal along the mating direction;
- the central part of the female terminal further includes a rim extending along the periphery of the central part, and cooperating with the shoulder to delimit the assembly position between the female terminal and the receptacle along the mating direction;
- the housing further includes a front collar covering the plurality of receptacles and designed to cooperate with a mating part of the complementary electrical socket;
- the ribs, arranged radially on an inner side of each receptacle and protruding transversely inward, project in parallel to the receptacle axis;
- the front part of the female terminal, projecting from its central part in the mating direction, consists of a plurality of blades extending symmetrically along a female terminal axis parallel to the receptacle axis;
- a front section of the blades comprises a recess formed in the outer surface of the blades and along a periphery of the front part of the female terminal;
- the recess accommodates a stress relief ring;
- the central part of the female terminal includes a ring with a conical end directed to the mating direction, the ring having a larger radial exterior than the front part, to center the female terminal with respect to the receptacle axis;
- the female terminal further includes a rear part projecting from the central part of the female terminal in an opposite sense to the mating direction;
- the rear part of the female terminal is assembled to an electrical wire;
- the central part of the female terminal includes a groove arranged between two rims and intended to receive a sealing ring;
- the ribs have a slanted rear portion to guide the respective terminal upon insertion.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIG. 3 is a detailed cross-section view of the power plug comprising the housing and the female terminal in an assembled position as depicted in FIG. 2 in accordance with one embodiment;

FIG. 4 is a detailed cross-section view of the power plug comprising the housing and the female terminal in a disassembled position as depicted in accordance with one embodiment;

On the different figures, the same reference signs designate like or similar elements.

DETAILED DESCRIPTION OF THE INVENTION

Figure 1A:
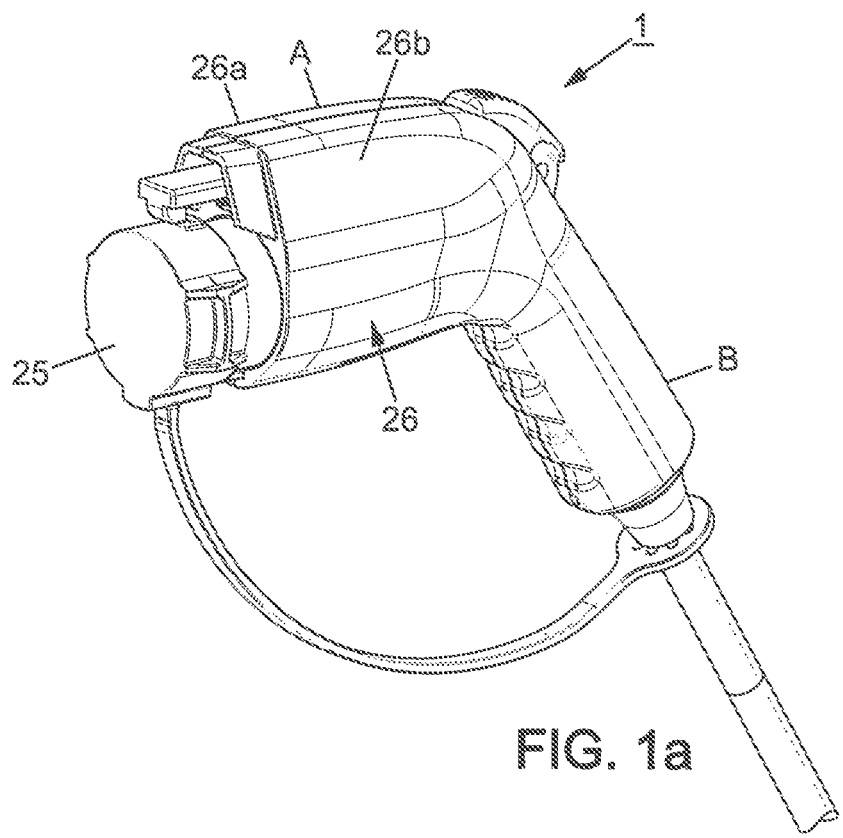
FIGS. 1a, 1b illustrate a perspective view of a such electrical power plug without the complementary socket 1 in accordance with one embodiment.
Figure 1B:
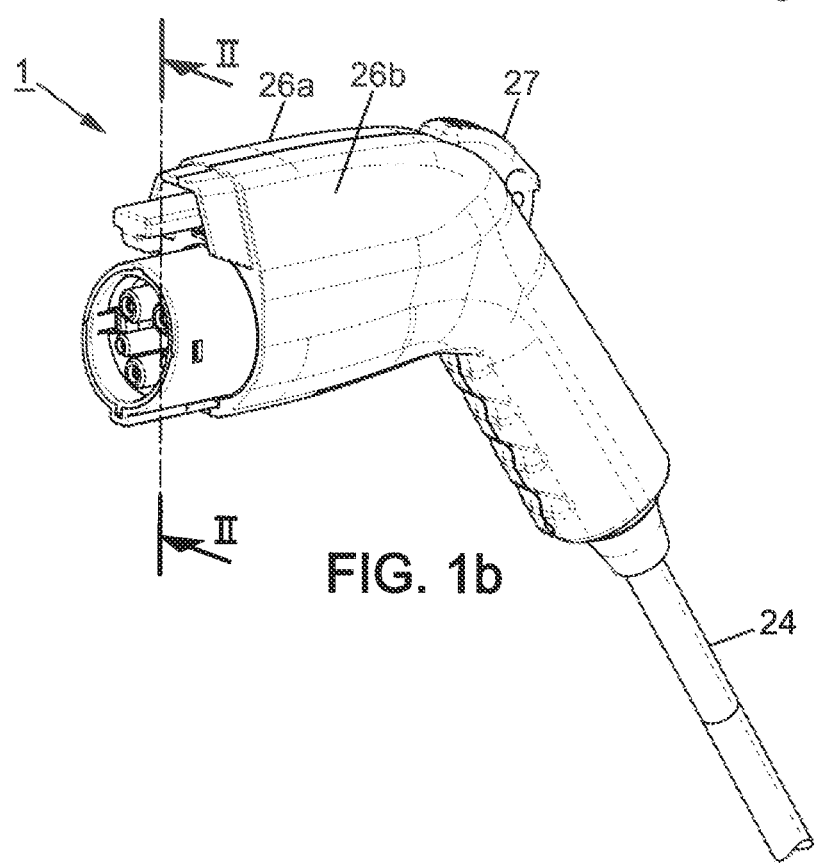
Figure 2:
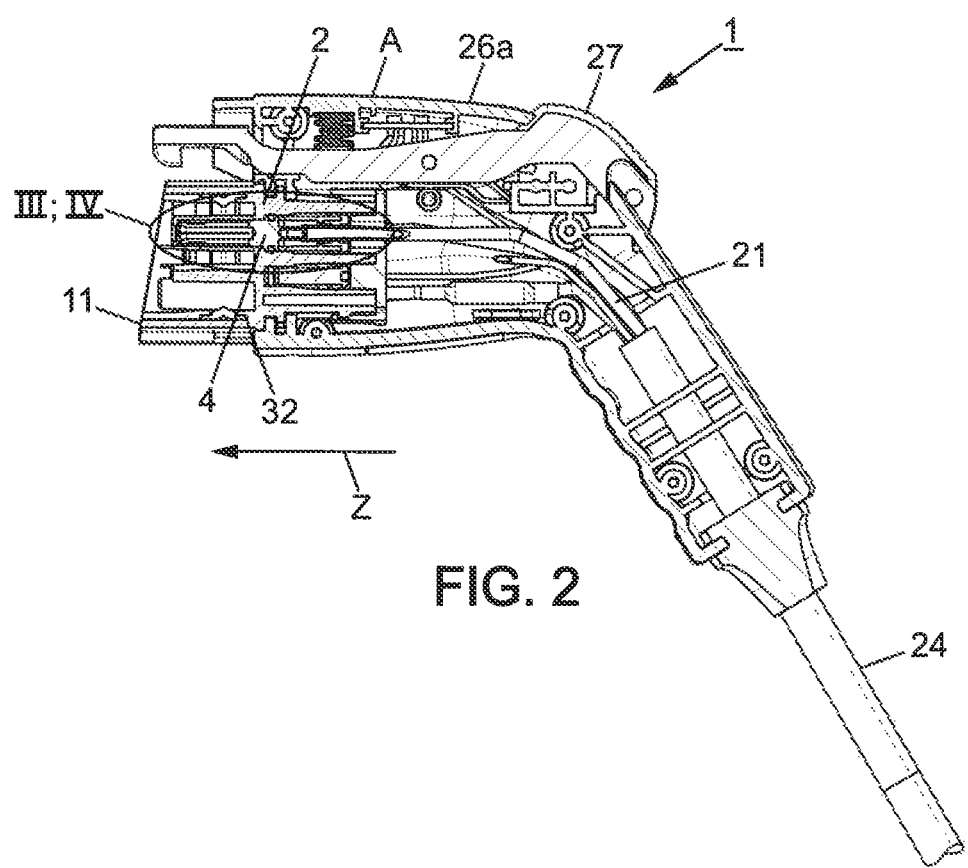
FIG. 2 is is a side cross section view of the electrical power plug as illustrated in FIG. 1b in accordance with one embodiment.

As illustrated in FIGS. 1a and 1b, an electrical power plug 1 is designed to be coupled with a complementary socket (not shown) and designed to receive a bundle 24 of electrical wires 21 (FIG. 2). The power plug 1 includes a mating section A, designed to be inserted into the complementary socket (not shown) in a mating direction (Z) and intended to receive a plurality of male terminals (not shown) of the complementary socket, and a rear section B, wherein a bundle 24 of electrical wires 21 is to be received (FIG. 2).

When the power plug 1 is not coupled with the complementary socket, a protective lid 25 can be put in front of the mating section A in order to prevent a penetration of moisture and foreign objects into the mating section (FIG. 1a). Thus, a lifetime of the power plug 1 can be extended.

FIG. 2, a side cross section view of the FIG. 1a, illustrates an interior space of the power plug 1, designed to be coupled with a complementary electrical socket (not shown) in a mating direction (Z).

The mating section A of the electrical power plug 1, as claimed, includes a housing 2 and a plurality of female terminals 4 passing through the housing 2 in the mating direction (Z).

The housing 2 is made of one molded plastic piece. In general, the housing 2 of the plug 1 is inserted into an outer body 26 consisting of two plastic molded covers 26a and 26b. The outer body 26 includes a locking element 27 to lock/unlock the power plug 1 with respect to the complementary socket. The locking element 27 extends from the outer body 26 in parallel to the mating direction (Z) and locks/unlocks the power plug 1 and the complementary socket transversely to the mating direction (Z).

In FIG. 3, the housing 2 includes a plurality of receptacles 3 situated inside the housing 2 and deployed regularly around a housing axis (H). Each of the receptacles 3, having its outer side and inner side, extends from the housing 2 in the mating direction (Z) and has generally a cylindrical shape. All the receptacles 3 comprise a central part 5 and a front part 6 extending from a central part 5 of the housing 2 in the mating direction (Z).

Each central part 5 of the receptacle 3 is intended to receive a female terminal 4 with a corresponding electrical wire 21. The central part 5 of the receptacle 3 further includes a transition characterized by a circular shoulder 19 deployed transversely outward the receptacle axis (R) and designed to delimit a relative position between the receptacle 3 and the corresponding female terminal 4 in the mating direction (Z) upon an assembly process (FIG. 3).

Figure 6:
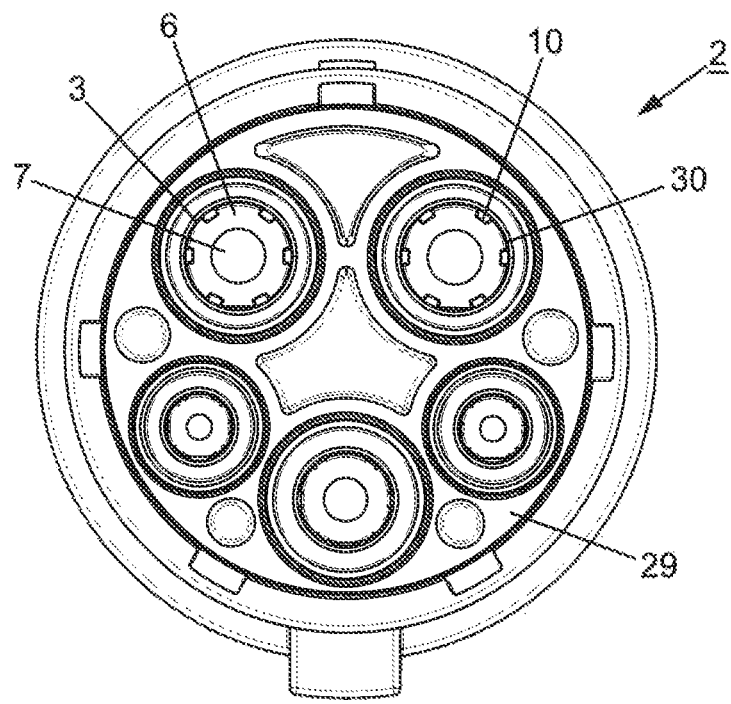
FIG. 6 is a rear view of the housing, as illustrated in FIG. 5, emphasizing a position of the ribs in accordance with one embodiment.

The front part 6, continuously following the central part 5 in the mating direction (Z), comprises at its extremity an opening 7 designed to receive a male terminal of the complementary socket (not shown). Each front part 6 of the receptacle 3 comprises, on its inner side, a plurality of ribs 10 protruding transversely towards the receptacle axis (R) (FIG. 3). More precisely, each inner side of the front part 6 of the receptacle 3 comprises six ribs 10 extending regularly along the receptacle axis (R) from the front part 6 to the central part 5 of the receptacle 3. The ribs 10 are arranged with a regular symmetry relative to the receptacle axis (R) and have rather a rectangular shape extending from the front part 6 toward the central part 5 of the receptacle 3. In this case, two adjacent ribs 10 form an angle of 60 degrees with respect to a face oriented transversely to the receptacle axis (R) (FIG. 6). Each rib 10 includes an end close to the central part 5 of the receptacle 3 and which has a slanted rear face 33 being designed to easily center the female terminal 4 into the receptacle 3 upon the mating process (FIG. 4). The slanted rear face 33 of the rib 10 is intended to cooperate with a front part 9 of the corresponding female terminal 4 in order to center the front part 9 with respect to the receptacle axis (R) parallel to the mating direction (Z) upon the mating process. If a mechanical connection between the receptacle 3 and the female terminal 4 is performed properly, then possible risks of damaging the female terminal 4 can be decreased.

Figure 5:
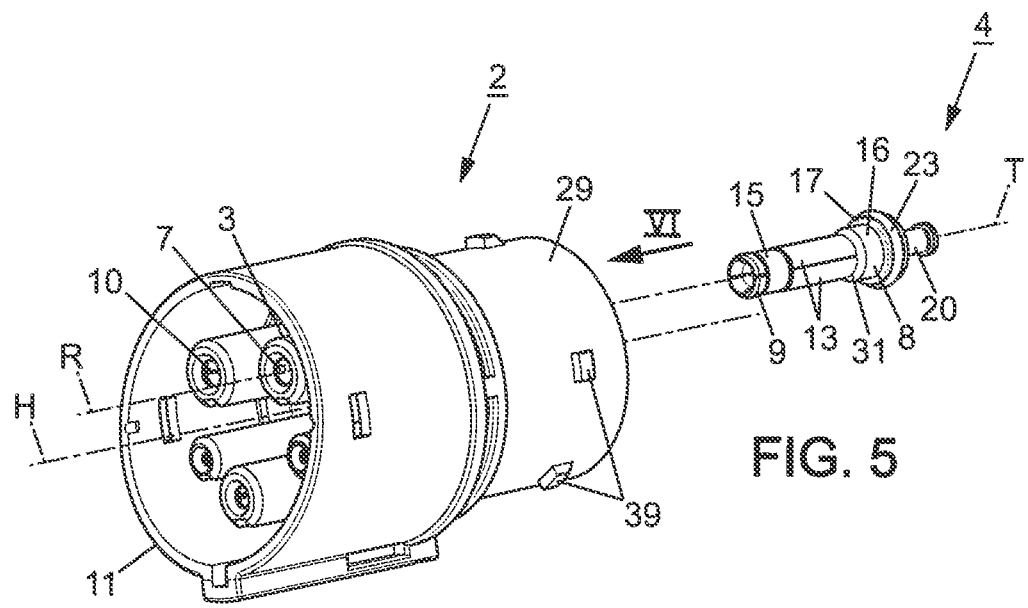
FIG. 5 illustrates a detailed perspective view of the housing with a plurality of receptacles and one of the corresponding female terminals in accordance with one embodiment.

Further, in FIG. 5, the housing 2 comprises a front collar 11, conserving the cylindrical shape of the housing 2 in the mating direction (Z). The front collar 11 is intended to cover the plurality of receptacles 3 extending from the housing 2 in the mating direction (Z) and to cooperate with a mating part of the complementary electrical socket upon the assembly process performed in the mating direction (Z). Further, an inner side of the front collar 11 provides a groove 32 to incorporate at least one sealing element 28 which is intended to be inserted between the front collar 11 and the mating part of the complementary electrical socket (not shown).

Finally, in FIG. 6, the housing 2 comprises also a rear end 29, extending in opposite sense to the mating direction, including a plurality of apertures 30 passing through the receptacles 3 from the rear end 29 to the front part 6 along the receptacle axis (R). The apertures 30 are adapted to receive the corresponding female terminal 4.

In FIGS. 3 and 5, the housing 2 is designed to receive a plurality of generally cylindrical female terminals 4 passing through the receptacles 3 of the housing 2 in the mating direction (Z). Each of the female terminals 4, being made of a metallic material, comprises a central part 8 located in the central part 5 of the receptacle 3, a front part 9 projecting from the central part 8 in the mating direction (Z), and a rear part 20 projecting from the central part 8 of the female terminal 4 in an opposite sense to the mating direction (Z). The front part 9 is adapted to receive a male terminal of the complementary electrical socket (not shown) and a rear part 20 is adapted to receive one of the electrical wires 21 from the bundle 24.

The front part 9 of the female terminal 4, projecting from its central part 8 in the mating direction (Z), consists of a plurality of blades 13 extending symmetrically along a female terminal axis (T) in the mating direction. More particularly, the front part 9 of each female terminal 4 includes four blades 13 which are intended each to cooperate with at least one of the six ribs 10 in order to center the female terminal axis (T) with the receptacle axis (R) upon the mating process (FIG. 5). For this purpose, each blade 13 exhibits a tapering shape 35 located on an outer side of its front part 9 extending in the mating direction (FIG. 4). This tapering shape 35 of the front part 9 is designed to cooperate with slanted rear faces 33 of the ribs 10 upon the mating process, and thus to make the mating process easier and the centering effect more efficient. Furthermore, as the number of the ribs 10, deployed regularly on the inner side of the front part 6 of the receptacle 3, is higher than the number of the blades 13, thus each of the four blades 13 is intended to cooperate with at least one of the six ribs 10. This ensures that, whatever is the rotation of the female terminal 4 around its terminal axis (T) upon the mating process with the receptacle 3 in the mating direction (Z), there is no need to pre-position the female terminal 4 with a given orientation before assembly. By this manner, a concentric effect between the female terminal 4 and the receptacle 3 is assured upon the mating process in the mating direction (Z).

Moreover, in FIG. 4, the inner side of the front part 9 of the female terminal 4 exhibits a widening shape 34 in the mating direction to easily receive the mating part of the male terminal of the complementary socket (not shown).

In FIG. 4, a front section of each blade 13 comprises a recess 14 extending transversely inward and along a cylindrical periphery of the front part 9 of the female terminal 4. This recess 14 is designed to accommodate a stress relief ring 15 able to conserve a continuously cylindrical shape of the front part 9 comprising the blades 13 during their deformation upon the assembly process in the mating direction (Z).

In FIG. 4, the central part 8 of the female terminal 4 is designed to be inserted into the central part 5 of the receptacle 3 in the mating direction (Z) upon the assembly process. The central part 8 is generally conserving the cylindrical shape of the whole female terminal 4. One part of the central part 8 includes an addition of material in form of a ring 16. This ring 16 extends transversely outwards the terminal axis (T) along a periphery of the one part of the central part 8. This additional ring 16 includes a conical end 31 directed to the mating direction (Z) to center the female terminal 4 with respect to the receptacle axis (R) upon the assembly process. A diameter of the ring 16 is intended to be only slightly smaller than a diameter of the central part 5 of the receptacle 3, and higher than a diameter of the front end of the front part 9, so that the terminal axis (T) is coinciding with the receptacle axis (R) upon the assembly process in the mating direction (Z).

In FIG. 4, another part of the central part 8 is equipped by a groove 22 arranged from two rims 17 and intended to receive a sealing ring 23. The groove 22 extends transversely outwards from the terminal axis (T) and is designed to conserve a generally circular form with respect to the female terminal 4. The groove 22 is also designed to receive the sealing ring 23 which has a circular cross-section and which is intended to prevent a penetration of the moisture and other foreign objects into the electrical contact space. The rim 17, closer to the front part 9 in the mating direction (Z), extends along the periphery of the central part 8, and cooperates with the shoulder 19 to delimit the relative position between the female terminal 4 and the receptacle 3 in the mating direction (Z) upon the assembly process.

The female terminal 4 includes also a rear part 20 which is adapted to receive one of the electrical wires 21 leaving from the bundle 24. The rear part 20, with an outer and inner surface, has a generally cylindrical shape and extends in opposite sense with respect to the mating direction (Z). Moreover, a rear extremity of the rear part 20 exhibits a convex shape in the mating direction to easily receive the electrical wire 21 of the bundle 24.

During an assembly process between the female terminal 4 and the receptacle 3, intended to receive the male terminal of the complementary socket (not shown), the front part 9 of the female terminal 4 is to be introduced into the front part 6 of the receptacle 3 of the housing 2 by passing through its central part 5 in the mating direction (Z).

Before the female terminal 4 reaches its final position in the receptacle 3, the blades 13 are away from the ribs 10 and there is a high angular and transverse clearance between the female terminal 4 and the receptacle 3. As the front part 9 of the female terminal 4 comes into proximity of the front part 6 of the receptacle 3, the transverse clearance between the female terminal 4 and the receptacle 3 decreases.

Hence, insertion of the female terminal 4 is easy. When inserting the female terminal 4 into the corresponding receptacle 3, the front part 9 of the female terminal 4 comes into proximity of the front part 6 of the receptacle 3, and the ribs 10, arranged radially on an inner side of the receptacle 3 and protruding transversely inward, cooperate with an outer side of a front extremity of the front part 9 to center the front part 6 with respect to the receptacle axis (R).

Furthermore, simultaneously, when inserting the female terminal 4 into the corresponding receptacle 3, a periphery of the ring 16, having the conical end 31 directed to the mating direction (Z) and located at the central part 5 of the female terminal 4, cooperates with the inner side of the central part 5 of the receptacle 3 to center the central part 8 of the female terminal 4 with respect to the receptacle axis (R). Moreover, the centering effect can be further enhanced by the sealing ring 23 inserted into the groove 22 and pressed between the groove 22 and an inner side of the aperture 30 located in the rear end 29 of the housing 2.

The female terminal 4 is locked in the receptacle 3 by any suitable way. For example, a rear locking plate 36 is locked to the housing 2 and forms a rear abutment 37 for the female terminal 4. The rear abutment 37 is for example provided to cooperate with a rear abutment face 38 provided on the rear rim 17. The rear locking plate 36 can be locked to the housing 2 with elastic lances which cooperates with pegs 39 of the housing 2 (FIG. 5) or by any other way.

It should be noted that the stress relief ring 15 is optional. In particular, it can be omitted, particularly for contacts of smaller diameters. The clearance between the blades 13 and the ribs 10 is such that they do not prevent insertion of the female terminal 4 in the housing 2.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A power plug configured to be coupled with a complementary electrical socket in a mating direction, the power plug comprising:
   a housing including a plurality of receptacles extending along a receptacle axis parallel to the mating direction, wherein each receptacle is designed to receive a female terminal, and wherein the receptacle has a central part and a front part provided with an opening intended to receive a male terminal of the complementary electrical socket;
   a plurality of generally cylindrical female terminals located through the housing in parallel to the mating direction, wherein the female terminal includes a central part located in the central part of the receptacle, a front part projecting from the central part in the mating direction and intended to receive the male terminal of the complementary electrical socket, wherein the receptacle includes a plurality of ribs arranged radially on an inner side of said receptacle, and protruding transversely inward, projecting in parallel to the receptacle axis, wherein the plurality of ribs are adapted to cooperate with the front part of the corresponding female terminal to center the front part of the corresponding female terminal with respect to the receptacle axis, and wherein the front part of the female terminal, projecting from its central part in the mating direction, consists of a plurality of blades extending symmetrically along a female terminal axis parallel to the receptacle axis and that the number of ribs is higher than the number of blades in the plurality of blades.

2. The power plug according to claim 1, wherein each receptacle, configured to receive corresponding female terminal, has generally a cylindrical shape.

3. The power plug according to claim 1, wherein the central part of each receptacle includes a shoulder forming a front stop for the female terminal along the mating direction.

4. The power plug according to claim 3, wherein the central part of the female terminal further includes a rim extending along the periphery of the central part, and cooperating with the shoulder to delimit an assembly position between the female terminal and the receptacle along the mating direction.

5. The power plug according to claim 1, wherein the housing further includes a front collar covering the plurality of receptacles and designed to cooperate with a mating part of the complementary electrical socket.

6. The power plug according to claim 1, wherein a front section of the plurality of blades comprises a recess formed in the outer surface of each blade and along a periphery of the front part of the female terminal.

7. The power plug according to claim 1, wherein the recess accommodates a stress relief ring.

8. The power plug according to claim 1, wherein the central part of the female terminal includes a ring with a conical end directed to the mating direction, said ring having a larger radial exterior than the front part, to center the female terminal with respect to the receptacle axis.

9. The power plug according to claim 1, wherein the female terminal further includes a rear part projecting from the central part of the female terminal in an opposite sense to the mating direction.

10. The power plug according to claim 9, wherein the rear part of the female terminal is assembled to an electrical wire.

11. The power plug according to claim 1, wherein the central part of the female terminal includes a groove arranged between two rims and intended to receive a sealing ring.

12. The power plug according to claim 1, wherein the plurality of ribs has a slanted rear portion to guide the respective terminal upon insertion.

* * * * *